(12) United States Patent
Baxendell et al.

(10) Patent No.: US 6,458,920 B1
(45) Date of Patent: Oct. 1, 2002

(54) PURIFICATION OF SOLUTIONS CONTAINING POLYCARBONATE

(75) Inventors: Richard Baxendell, Amherst, MA (US); Christian Kords, Krefeld (DE); Lora Rand, Kemah, TX (US); Jürgen Heuser, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/807,791
(22) PCT Filed: Oct. 12, 1999
(86) PCT No.: PCT/EP99/07653
§ 371 (c)(1), (2), (4) Date: May 23, 2001
(87) PCT Pub. No.: WO00/24806
PCT Pub. Date: May 4, 2000
(51) Int. Cl.⁷ .............................................. C08G 64/00
(52) U.S. Cl. ........................ 528/480; 528/198; 528/196
(58) Field of Search ................................. 528/480, 196, 528/198

(56) References Cited

FOREIGN PATENT DOCUMENTS

EP        0014462        *   2/1980

* cited by examiner

Primary Examiner—Terressa M. Boykin
(74) Attorney, Agent, or Firm—Joseph C. Gil; James R. Franks; Aron Preis

(57) ABSTRACT

The production of polycarbonate by the phase boundary method is disclosed. In accordance with the inventive process, a solution that contains polycarbonate is repeatedly washed with a washing liquid and the washing liquid is separated from the solution that contains the polycarbonate by separating elements and the solvent is then evaporated. The process is characterized in that the organic solution that contains the polycarbonate and the washing liquid are separated from each other after the first washing stage in a coalescer that contains hydrophilic packing.

16 Claims, 2 Drawing Sheets

PURIFICATION OF SOLUTIONS CONTAINING POLYCARBONATE

FIELD OF THE INVENTION

This invention relates to a process for the production of high-purity polycarbonates and to a process for the purification of solutions which contain polycarbonate.

BACKGROUND OF THE INVENTION

In order to produce polycarbonates by what is termed the phase boundary method, dihydroxydiarylalkanes in the form of their alkali salts are reacted with phosgene in heterogeneous phase in the presence of inorganic bases such as caustic soda and in the presence of an organic solvent in which the polycarbonate product is readily soluble. During the reaction, the aqueous phase is distributed within the organic phase, and after the reaction the organic phase which contains the polycarbonate is separated from the aqueous phase and is repeatedly washed with an aqueous liquid in order to remove electrolytes, residual monomers and catalyst, amongst other contaminants, and the washing liquid is subsequently separated as extensively as possible.

After washing the organic solution which contains polycarbonate with an aqueous washing liquid, a milky, turbid liquid is obtained. Separation of the aqueous phase, which contains salts, from the organic phase which contains polycarbonate, is usually effected in a plurality of stages by means of what are termed phase separation devices which operate in the manner of centrifuges and in which the organic solution is separated from the aqueous liquid due to the different densities thereof.

A purification process for polycarbonates is known from DE 195 10 061 A1 in which the mixture which is obtainable from the production process, and which comprises an organic phase which contains polycarbonate and an aqueous phase which contains salts, is separated into these two phases in a first separating stage, the organic phase is subsequently washed with a dilute mineral acid in order to remove any catalyst which possibly remains, the resulting two-phase mixture is next separated from the bulk of the aqueous phase in a phase separation device which operates in the manner of a centrifuge, the remaining organic phase which contains polycarbonate is optionally passed through one or more coalescers to remove adhering residual water which contains salts, and the washing procedure, as well as the separation of the phases, are repeatedly carried out again. The coalescers which are used in this process are packed with a material with a strongly hydrophobic surface, such as polypropylene fibres or polytetrafluorethylene fibres.

SUMMARY OF THE INVENTION

Compared with this known process, the underlying object of the present invention is to provide a purification process for the purification of solutions which contain polycarbonate, and is to provide a process for the production of polycarbonates which is improved as regards its susceptibility to malfunctions and as regards its economics and which in addition enables an even purer final product to be obtained, i.e. a purer polycarbonate, copolycarbonate or polyester carbonate.

This object is achieved by a process for the production of polycarbonate by the phase boundary method, wherein a solution which contains polycarbonate is washed with an aqueous washing liquid, the washing liquid is separated from the solution which contains polycarbonate and the solvent is evaporated, wherein the organic solution which contains polycarbonate and the washing liquid are separated from each other after the first washing stage in a coalescer comprising a hydrophilic packing.

The present invention further relates to a process for the purification of solutions which contain polycarbonate, wherein the solution which contains polycarbonate is washed with an aqueous washing liquid, the washing liquid is separated from the solution which contains polycarbonate and the solvent is evaporated, wherein the organic solution which contains the polymer is separated from the aqueous washing liquid after the first washing stage in a coalescer comprising a hydrophilic packing.

DETAILED DESCRIPTION OF THE INVENTION

Figure 1:
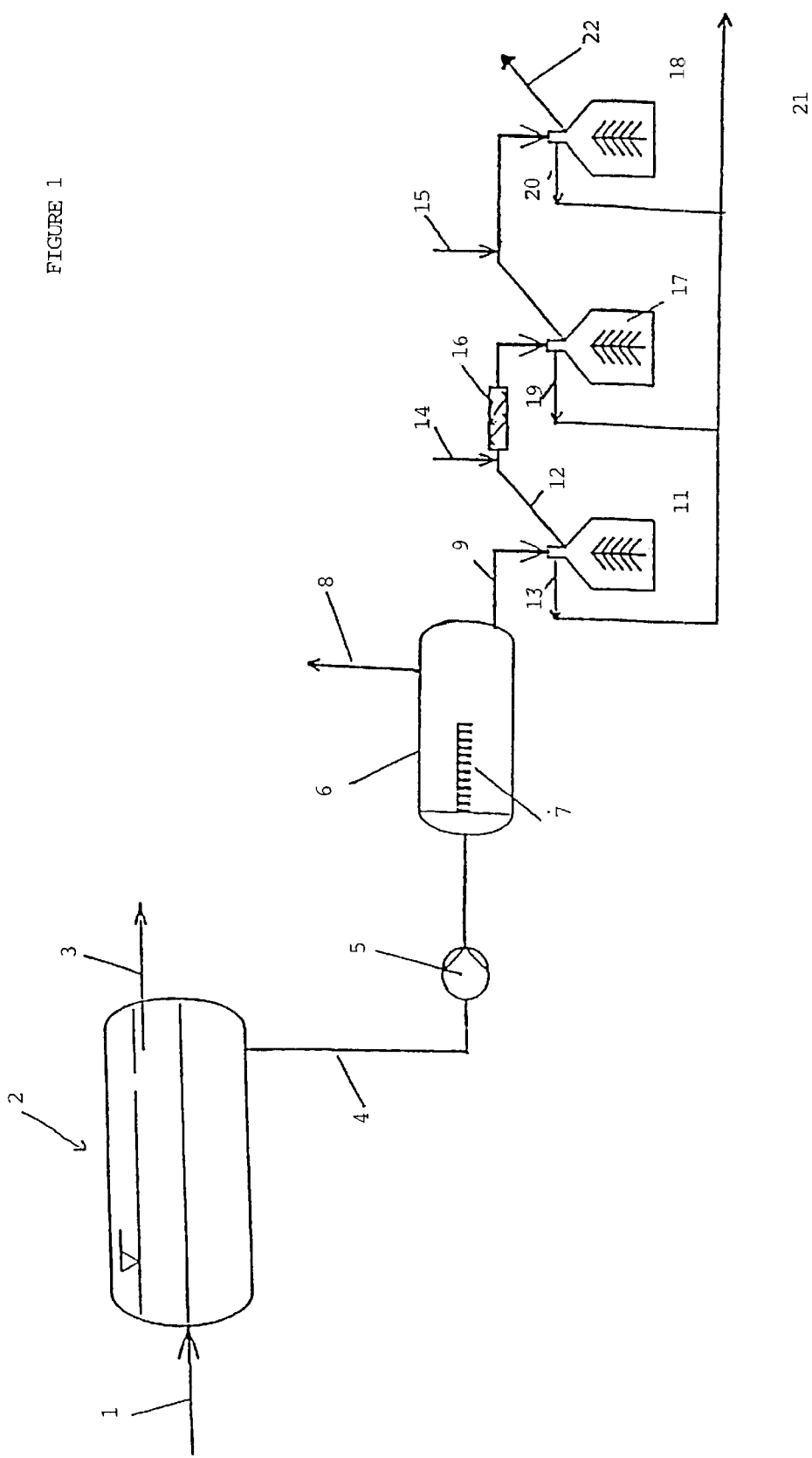
FIG. 1 is a schematic representation of an embodiment of the process according to the present invention in which separation of the washing liquid is first effected in a coalescer (6) comprising a hydrophill packing (7), and is subsequently effected in centrifuges (e.g., 17 and 18) in the following washing stages.

It has surprisingly been shown that after polymerisation, after the separation of the organic phase from the aqueous phase, and after the first washing of the organic phase, it is not necessary to effect the first separation of the organic phase and the washing water by means of a centrifuge, as has been the practice for decades. Moreover, it was not possible to anticipate that these known phase separation elements which operate based on the principle of a centrifuge can even be dispensed with completely if they are replaced by coalescers comprising a hydrophilic packing.

In known washing processes for the purification of process streams containing polycarbonate, a sodium content of 250 ppm in the polycarbonate was determined upstream of the first washing stage, and a sodium content of 0.078 ppm was determined downstream of the third washing stage. If a process stream such as this is divided, and the separated part is washed in a multi-stage coalescer washing section, a sodium content of only 0.038 ppm in the polycarbonate is measured downstream of the third coalescer.

The coalescers which can be used for phase separation are commercially available coalescers such as those which comprise a hydrophilic packing and which are sold by Pall GmbH, D-63303 Dreieich or Franken Filter-technik OHG, D-50354 Hüirth. According to one particular embodiment of the process according to the invention, metal fibres are used as the hydrophilic packing, wherein stainless steel fibres are particularly preferred. These metal fibres have a diameter of 2 to 50 $\mu$m, or 3 to 7 $\mu$m for example, and according to one particularly preferred embodiment have a diameter of 4.5 to 5.5 $\mu$m. According to another preferred embodiment, metal fibres of different thicknesses may be present in the coalescers, for example. Thus a combination of metal fibres with fibre thicknesses of 2 mm and 10 mm has thus proved to be particularly effective for phase separation. The layer thickness of the fibre bed can be 3 to 25 mm, preferably 4 to 12 mm, and according to a particularly preferred embodiment can be 5 to 7 mm. It is desirable that the throughput per phase element is about 0.5 to 5 $m^3$/hour, most preferably 1.8 to 2.2 $m^3$/hour.

The organic phase which contains the polycarbonate can be washed 3 to 5 times with an aqueous liquid for example, wherein the two-phase mixture which is obtained is subsequently separated in a coalescer into an organic and an aqueous phase each time.

In an embodiment of the invention in which a coalescer is used only for the first separation of washing water, the further separating elements which are used for phase separation are preferably the centrifuges which were used in the past for phase separation.

One particular advantage of the embodiment of the invention which comprises the exclusive use of coalescers for phase separation is that the concentration of polycarbonate in the organic phase can be higher than in that embodiment in which known centrifuges are used for phase separation. Whereas the polycarbonate concentration in the organic phase in the latter process may not be higher than 14% by weight with respect to the weight of the non-aqueous organic phase, the exclusive use according to the invention of am coalescers for phase separation enables a polycarbonate concentration of 15 to 20% by weight with respect to the weight of the organic phase to be achieved during washing. At these concentrations, the organic phase has a viscosity of 100 to 1400 mPas for example, preferably 150 to 1000 mPas, and according to one particularly preferred embodiment it has a viscosity of 180 to 700 mPas.

According to another embodiment of the invention, mixing pumps, particularly centrifugal pumps, or mixing nozzles, are used for the mixing in of the washing liquid. When the washing liquid is mixed in by means of these processing units, an increase in the purity of the polycarbonate by a factor of 2 can be achieved compared with the use of static mixers.

The polymers which are purified or produced according to the invention are polycarbonates, including both homopolycarbonates and copolycarbonate and mixtures thereof. The polycarbonates according to the invention can be aromatic polyester carbonates or polycarbonates which are present in admixture with aromatic polyester carbonates. The term "polycarbonate" is used below to represent the aforementioned polymers.

The polycarbonate according to the invention is obtained by what is termed the phase boundary method (H. Schnell "Chemistry and Physics of Polycarbonates", Polymer Reviews, Vol. 9, page 33 et seq., Interscience Publishers, New York (1964).

The compounds which are preferably used as starting materials according to the invention are bisphenols of general formula HO—Z—OH, wherein Z is a divalent organic radical which comprises 6 to 30 carbon atoms and which contains one or more aromatic groups. Examples of compounds such as these include bisphenols which form part of the group comprising dihydroxydiphenyls, bis(hydroxyphenyl)alkanes, indan bisphenols, bis(hydroxyphenyl) ethers, bis(hydroxyphenyl) sulphones, bis(hydroxyphenyl) ketones and α,α'-bis(hydroxyphenyl) diisopropylbenzenes.

Bisphenols which are particularly preferred and which form part of the aforementioned groups of compounds include bisphenol A, tetraalkylbisphenol A, 4,4-(metaphenylenediisopropyl)diphenol (bisphenol M) and bisphenol-trimethylcyclohexanone (BP-TMC), and also optionally include mixtures thereof. The copolycarbonates which are particularly preferred are those which are based on monomeric bisphenol A and 1,1-bis-(4-hydroxyphenyl)-3,5-trimethylcyclohexane. The bisphenol compounds which can be used according to the invention are reacted with compounds of carbonic acid, particularly phosgene.

The polyester carbonates according to the invention are obtained by the reaction of the aforementioned bisphenols with at least one aromatic dicarboxylic acid and optionally with carbonic acid. Examples of suitable aromatic dicarboxylic acids include orthophthalic acid, terephthalic acid, isophthalic acid, 3,3'- or 4,4'-diphenyldicarboxylic acid and benzophenone dicarboxylic acids.

Examples of the inert organic solvents which are used in the process include dichloromethane, various dichlorethanes and chloropropane compounds, chlorobenzene and chlorotoluene. Dichloromethane and mixtures of dichloromethane and chlorobenzene are preferably used.

The reaction can be speeded up by catalysts such as tertiary amines, N-alkylpiperidines or onium salts. Tributylamine, triethylamine and N-ethylpiperidine are preferably used. A monofunctional phenol, such as phenol, cumylphenol, p.-tert.-butylphenol or 4-(1,1,3,3-tetramethylbutyl)phenol can be used as a chain-termninating agent or molecular weight regulator. Isatin bis-cresol can be used as a branching agent, for example.

In order to produce the high-purity polycarbonates according to the invention, the bisphenols are dissolved in an aqueous, alkaline phase, preferably in caustic soda. The chain terminating agents which may possibly be necessary for the production of copolycarbonates are dissolved in the aqueous, alkaline phase in amounts of 1.0 to 20.0 mole % per mole of bisphenol, or are added to the organic phase. Phosgene is subsequently passed into the mixture containing the other reaction components and polymerisation is effected.

Part of the carbonate groups in the polycarbonates, namely up to about 80 mole %, preferably 20 to 50 mole % of the carbonate groups, can be replaced by aromatic dicarboxylic acid ester groups.

These thermoplastic polycarbonates have average molecular weights $M_w$ (determined by measuring the relative viscosity at 25° C. in dichloromethane at a concentration of 0.5 g polycarbonate/100 ml dichloromethane) from 12,000 to 400,000. preferably from 12,000 to 80,000, particularly from 15,000 to 40,000.

During the reaction the aqueous phase is emulsified in the organic phase. Droplets of different sizes are formed in the course of this process. The reaction is followed by a phase separation into an organic phase containing the polycarbonate and into an aqueous phase. The organic phase which contains the polycarbonate is subsequently washed repeatedly with an aqueous liquid and after each washing operation it is separated as extensively as possible from the aqueous phase. Mixing units such as stirring apparatuses and static mixers can be used for the mixing in of the acid and the washing water. After washing and separation of the washing liquid, the polymer solution is turbid. The washing liquid is an aqueous liquid and can be either a dilute mineral acid such as HCI or $H_3PO_4$ or water. The concentration of HCI or $H_3P)_4$ in the washing liquid can range from 0.5 to 1.0% by weight, for example. The organic phase may be washed five times, for example.

In order to obtain the high-purity polycarbonate, the solvent is evaporated. Evaporation can be effected in a plurality of evaporator stages. According to another preferred embodiment of this invention, the solvent or part of the solvent can be removed by spray-drying. The high-purity polycarbonate is then formed as a powder. The same applies to the production of the high-purity polycarbonate by precipitation from the organic solution.

The high-purity polycarbonates which are obtained or purified according to the invention are suitable for the production of mouldings. Particular examples of mouldings made from this high-purity polycarbonate include optical and magneto-optic data storage media such as mini discs, compact discs or digital versatile discs, optical lenses and prisms, window glasses for motor vehicles and cover lenses for headlamps, other types of glazing such as glazing for greenhouses, and what are termed ribbed double sheets or cavity panels. These mouldings are produced by injection-moulding methods, extrusion methods and extrusion blow-moulding methods, using a polycarbonate which is obtained according to the invention and which has a suitable molecular weight.

The preferred molecular weight range for data storage media is from 12,000 to 22,000; for lenses and glazing it is from 22,000 to 32,000, and the molecular weight range for sheets and cavity panels is from 28,000 to 40,000. All the aforementioned molecular weight data relates to the weight average molecular weight.

The mouldings optionally comprise a surface coating, for example a scratch-resistant coating.

For the production of optical lenses and sheeting, or of discs for magneto-optic data storage media, polycarbonates according to the invention which have a molecular weight from 12,000 to 40,000 are preferably used, since a material with a molecular weight within this range can very readily be subjected to a thermoplastic moulding operation. Mouldings can be produced by injection-moulding methods. For this purpose, the resin is melted at temperatures from 300 to 400° C. and the mould is generally maintained at a temperature of 50 to 140° C.

The processing of the liquid stream which contains polycarbonate is described below with reference to FIG. 1. In a preliminary separation in a phase separation vessel 2, the reaction emulsion 1 which is obtained by the two-phase boundary method after polymerisation is separated into an aqueous phase 3 which contains salts and into an organic phase 4 which contains the polycarbonate. Whereas the aqueous phase 3 is fed to a waste water conditioning stage, the organic phase 4 is pumped by the pump 5 into a coalescer 6 which comprises a phase separation element 7 which has a diameter of 150 mm and a length of 1250 mm. The fibre bed of the phase separation element 7 consists of stainless steel fibres with a diameter of about 5 µm. The layer thickness of the fibre bed can amount to 6 mm. 2100 1/hour of polymer solution were passed through this coalescer at a differential pressure of 500 mbar. The residual water 8 which is deposited in the coalescer is fed to a waste water conditioning stage. The organic phase 9 is then mixed with an aqueous liquid 14/15 in two stages disposed in series, and is washed in the course of this procedure. The organic phase 12 is first mixed with what is an approximately 1% by weight solution of HCl 14 in a static mixer 16 and is washed in the course of this procedure in order to remove any catalyst which may still be present. In the next stage, deionised water 15 is used as the washing liquid, wherein mixing of the organic phase which contains the polycarbonate is again effected in a static mixer 16. After each mixing operation with the aqueous liquid, the two-phase mixture which is obtained is separated again by the centrifuges 17/18 each time. The aqueous phases 19/20 are removed from the centrifuges and are combined with the aqueous phase 13 and are fed as stream 21 to the waste water conditioning stage. The organic phase 22, the residual water content of which has been reduced to <0.2% by weight, is pumped into a storage tank. The temperature of the organic phase 22 is 40 to 50° C. during the washing operations.

Figure 2:
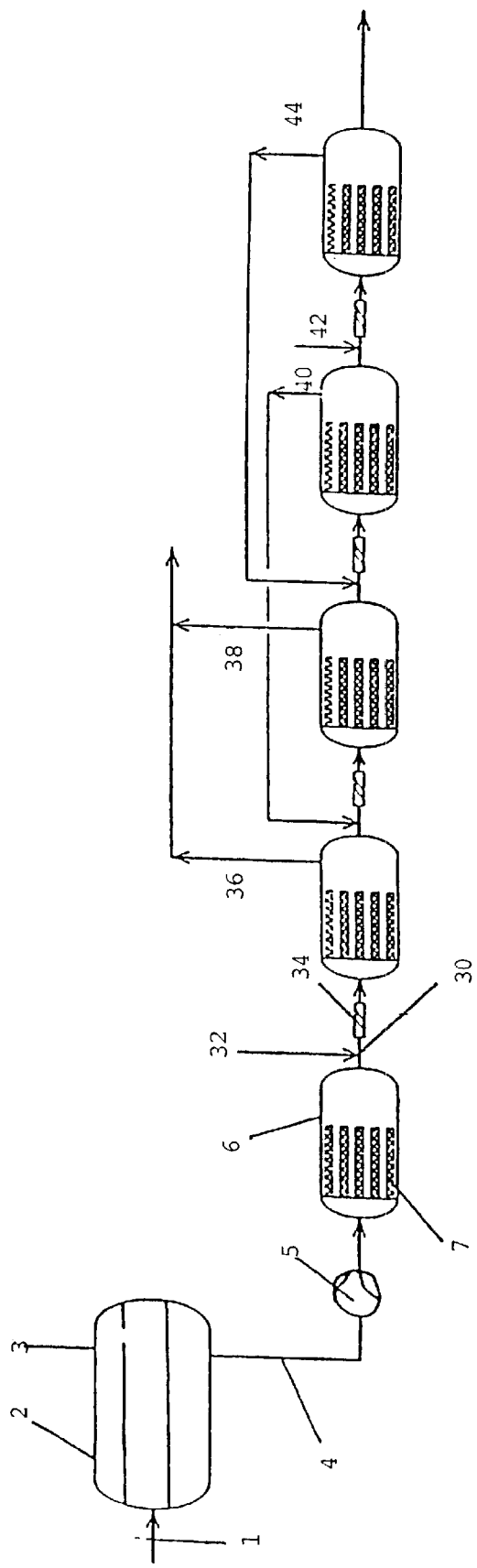
FIG. 2 is a schematic representation of an embodiment of the process according to the present invention in which the washing liquid of each washing stage is separated by a coalescer (e.g., 6), in the absence of a centrifuge.

The process shown in FIG. 2 is first of all conducted identically to that shown in FIG. 1, wherein the polycarbonate concentration in the organic phase is 15%. From the coalescer 6, the organic phase 30 is fed into a static mixer 34, where it is mixed with aqueous 1% by weight HCl and washed. The mixture obtained is fed to a further coalescer of identical construction and the aqueous phase is separated from the organic phase there. In the next stage, water 40 is used for washing and is obtained from the separation of the organic and aqueous phase in a separating stage disposed downstream. Instead of this, however, deionised water could also be used. Reference numeral 42 denotes the addition of deionised water and reference numeral 44 denotes the return of the water used to an upstream washing stage. The aqueous phases 36/38 are fed to the waste water conduit and the organic phase is pumped into a storage tank. The temperature of the organic phase is 40 to 50° C. during the purification operation.

The phase separation elements which are used have a diameter of 150 mm and a length of 1250 mm. The fibre beds of the separating elements consist of stainless steel fibres with fibre thicknesses of about 2 mm and of about 5 mm. The layer thickness of the fibre bed is 6 mm. 2100 1/hour were passed through the coalescer at a differential pressure of 500 Pa (500 mbar), wherein it was possible to reduce the water adhering to the residual organic phase to less than 2% by weight.

For comparison, the same experimental arrangement was employed except that lipophilic woven fabrics made of PTFE fibre were used as the separation means. At a differential pressure of 300 mPa (3 bar) it was only possible to obtain a throughput of 200 1/hour, and the residual water content of the organic phase was between 0.2 and 0.45% by weight.

What is claimed is:

1. A process of purifying polycarbonate formed by means of phase boundary synthesis, comprising:

washing repeatedly a solution comprising phase boundary synthesized polycarbonate with a washing liquid;

separating the washing liquid from a solution which comprises polycarbonate and said washing liquid after each washing stage by means of separating elements; and evaporating solvent from an organic phase comprising purified polycarbonate, wherein the washing liquid is separated from the solution which comprises polycarbonate and the washing liquid after the first washing stage in a coalescer comprising a hydrophilic packing as the separating element, said hydrophilic packing having a fiber bed layer thickness of 5 to 7 mm.

2. A process of purifying a solution comprising polycarbonate, said process comprising:

washing repeatedly the solution comprising polycarbonate with an aqueous washing liquid; and separating the washing liquid from a solution comprising polycarbonate and said washing liquid after each washing stage by means of separating elements, wherein the washing liquid is separated from the solution comprising polycarbonate and said aqueous washing liquid after the first washing stage in a coalescer comprising a hydrophilic packing as the separating element, said hydrophilic packing having a fiber bed layer thickness of 5 to 7 mm.

3. The process of claim 1 wherein coalescers are used in further stages for the separation of an organic phase which contains the polycarbonate from aqueous washing liquid.

4. The process of claim 2 wherein coalescers are used in further stages for the separation of an organic phase which contains the polycarbonate from aqueous washing liquid.

5. The process of claim 1 wherein said hydrophilic packing comprises metal fibers.

6. The process of claim 2 wherein said hydrophilic packing comprises metal fibers.

7. The process of claim 6 wherein the metal fibers are stainless steel fibers having fiber diameters of about 2 $\mu$m and of about 10 $\mu$m.

8. The process of claim 3 wherein the organic phase which contains polycarbonate is washed three to five times with an aqueous liquid and the two-phase mixture which is obtained is separated in a coalescer.

9. The process of claim 4 wherein the organic phase which contains polycarbonate is washed three to five times with an aqueous liquid and the two-phase mixture which is obtained is separated in a coalescer.

10. process of claim 1 wherein the washing liquid is mixed with the organic liquid which contains polycarbonate via mixer pumps.

11. The process of claim 2 wherein the washing liquid is mixed with the organic liquid which contains polycarbonate via mixer pumps.

12. A polycarbonate prepared by the process of claim 1.

13. A thermoplastic molding composition comprising the polycarbonate of claim 12.

14. The process of claim 5 wherein the metal fibers are stainless steel fibers with fiber diameters of about 2 $\mu$m and of about 10 $\mu$m.

15. The process of claim 5 wherein the metal fibers are stainless steel fibers having fiber diameters of from 3 $\mu$m to 7 $\mu$m.

16. The process of claim 6 wherein the metal fibers are stainless steal fibers having fiber diameters of from 3 $\mu$m to 7 $\mu$m.

* * * * *